US010129101B2

(12) United States Patent
Luo et al.

(10) Patent No.: US 10,129,101 B2
(45) Date of Patent: Nov. 13, 2018

(54) APPLICATION DRIVEN AND ADAPTIVE UNIFIED RESOURCE MANAGEMENT FOR DATA CENTERS WITH MULTI-RESOURCE SCHEDULABLE UNIT (MRSU)

(71) Applicant: Futurewei Technologies, Inc., Plano, TX (US)

(72) Inventors: Min Luo, San Jose, CA (US); David Estevez, San Francisco, CA (US); Jiafeng Zhu, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 236 days.

(21) Appl. No.: 15/132,443

(22) Filed: Apr. 19, 2016

(65) Prior Publication Data

US 2016/0323880 A1 Nov. 3, 2016

Related U.S. Application Data (60) Provisional application No. 62/154,805, filed on Apr. 30, 2015.

(51) Int. Cl.
*H04L 12/24* (2006.01)
(52) U.S. Cl.
CPC ...... *H04L 41/5025* (2013.01); *H04L 41/0896* (2013.01); *H04L 41/5054* (2013.01); *H04L 41/5096* (2013.01)
(58) Field of Classification Search
CPC ............. H04L 41/5025; H04L 41/5054; H04L 41/0896; H04L 41/5096
See application file for complete search history.

(56) References Cited

U.S. PATENT DOCUMENTS

| 8,898,402 | B1* | 11/2014 | Stronge | G06F 3/0605 |
| | | | | 711/100 |
| 2008/0244209 | A1* | 10/2008 | Seelam | G06F 3/061 |
| | | | | 711/168 |

(Continued)

FOREIGN PATENT DOCUMENTS

| CN | 101488903 A | 7/2009 |
| CN | 102932279 A | 2/2013 |
| CN | 103703724 A | 4/2014 |

OTHER PUBLICATIONS

Foreign Communication From a Counterpart Application, PCT Application No. PCT/CN2016/080233, International Search Report dated Jul. 21, 2016, 7 pages.

(Continued)

*Primary Examiner* — Tejis Daya
(74) *Attorney, Agent, or Firm* — Conley Rose, P.C.

(57) ABSTRACT

An apparatus comprising a processor configured to obtain estimated processing requirements, estimated memory requirements, estimated storage requirements, and estimated network communication requirements for a plurality of data center (DC) tenants; determine a Minimum Resource Schedulable Unit (MRSU) for the tenants, the determined MRSU comprising a dynamically allocatable group of processor resources, processing memory resources, storage resources, and network resources comprised in at least one of a plurality of DC servers, wherein the MRSU is determined such that each DC tenant's estimated processing requirements, estimated memory requirements, estimated storage requirements, and estimated network communications requirements are met by allocation of a corresponding integer value of MRSUs; and allocate the corresponding integer value of MRSUs to each DC tenant as an MRSU allocation; and a transmitter coupled to the processor and (Continued)

configured to transmit the MRSU allocation to the DC servers for allocation to the DC tenants.

20 Claims, 6 Drawing Sheets

(56) References Cited

U.S. PATENT DOCUMENTS

| | | | |
|---|---|---|---|
| 2010/0077449 A1* | 3/2010 | Kwok | G06F 9/5027 726/3 |
| 2013/0014101 A1* | 1/2013 | Ballani | H04L 67/101 718/1 |
| 2013/0219068 A1* | 8/2013 | Ballani | G06F 9/5061 709/226 |
| 2014/0115165 A1 | 4/2014 | Sonoda et al. | |
| 2015/0066646 A1 | 3/2015 | Sriharsha et al. | |
| 2015/0334696 A1* | 11/2015 | Gu | H04L 67/1095 718/1 |
| 2016/0043892 A1 | 2/2016 | Hason et al. | |
| 2016/0094413 A1* | 3/2016 | Jain | H04L 41/5019 709/226 |

OTHER PUBLICATIONS

Foreign Communication From a Counterpart Application, PCT Application No. PCT/CN2016/080233, Written Opinion dated Jul. 21, 2016, 4 pages.

Gutierrez-Estevez, D., et al., "Multi-resource Schedulable Unit for Adaptive Application-driven Unified Resource Management in Data Centers," XP032840086, International Telecommunication Networks and Applications Conference (ITNAC), Nov. 18, 2015, 8 pages.

Grandl, R., et al., "Multi-Resource Packing for Cluster Schedulers," XP058064824, Computer Communication Review, vol. 44, No. 4, Aug. 17, 2014, 12 pages.

Foreign Communication From a Counterpart Application, European Application No. 16785919.8, Extended European Search Report dated Mar. 13, 2018, 8 pages.

* cited by examiner

APPLICATION DRIVEN AND ADAPTIVE UNIFIED RESOURCE MANAGEMENT FOR DATA CENTERS WITH MULTI-RESOURCE SCHEDULABLE UNIT (MRSU)

CROSS-REFERENCE TO RELATED APPLICATIONS

The present application claims the benefit of U.S. Provisional Patent Application No. 62/154,805 filed Apr. 30, 2015, by Min Luo et al., and entitled, "Application Driven and Adaptive Unified Resource Management For Data Centers with Multi-Resource Schedulable Unit (MRSU)," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

With the advent of cloud computing technology, hardware (such as CPUs, memory, storage, and networking resources) can be provided to tenants on demand by employing virtualization technology. Therefore the hardware can be shared in a cloud computing environment, allowing the facility to operate while employing significantly fewer resources (such as servers) than a similarly situated facility employing a dedicated architecture. In search of ever greater optimization of cloud computing systems, hardware assignment and sharing schemes have become increasingly complex.

SUMMARY

In one embodiment, the disclosure includes an apparatus comprising a processor configured to obtain estimated processing requirements for a plurality of data center (DC) tenants; obtain estimated CPU, memory requirements for the DC tenants; obtain estimated storage requirements for the DC tenants; and obtain estimated network communication bandwidth requirements for the DC tenants; determine a Minimum Resource Schedulable Unit (MRSU) for the tenants, the determined MRSU comprising a dynamically allocatable group of correlated processor resources, processing memory resources, storage resources, and network bandwidth resources, wherein the correlated processor resources, processing memory resources, storage resources, and network resources are comprised in at least one of a plurality of DC servers, and wherein the MRSU is determined such that each DC tenant's estimated processing requirements, estimated memory requirements, estimated storage requirements, and estimated network communications requirements are met by allocation of a corresponding integer value of MRSUs; and allocate the corresponding integer value of MRSUs to each DC tenant as an MRSU allocation; and a transmitter coupled to the processor and configured to transmit the MRSU allocation to the DC servers for allocation to the DC tenants.

In another embodiment, the disclosure includes a method implemented in a management node, the method comprising determining, by a processor of the management node, estimated application resource requirements for a plurality of tenants in a DC, wherein the estimated application resource requirements comprise estimated processing requirements, and estimated memory requirements, estimated storage requirements; determining, by the processor, a MRSU for the tenants, the determined MRSU comprising a dynamically allocatable group of correlated processor resources, processing memory resources, and storage resources, wherein the correlated processor resources, processing memory resources, and storage resources are comprised in at least one of a plurality of DC servers, and wherein the MRSU is determined such that each DC tenant's estimated processing requirements, estimated memory requirements, and estimated storage requirements are met by allocation of a corresponding integer value of MRSUs; allocating, by the processor, the corresponding integer value of MRSUs to each DC tenant as an MRSU allocation; and transmitting, by a transmitter of the management node, the MRSU allocation to the DC servers for allocation to the DC tenants.

In another embodiment, the disclosure includes a non-transitory computer readable medium comprising a computer program product of executable instructions stored on the non-transitory computer readable medium such that when executed by a processor cause a management node in a DC to determine estimated application resource requirements for a plurality of tenants in the DC, wherein the estimated application resource requirements comprise estimated processing requirements, estimated memory requirements, estimated storage requirements, and estimated network communication requirements for each DC tenant; determine a MRSU for the tenants, the determined MRSU comprising a dynamically allocatable group of correlated processor resources, processing memory resources, storage resources, and network resources, wherein the correlated processor resources, processing memory resources, storage resources, and network resources are comprised in at least one of a plurality of DC servers, and wherein the MRSU is determined such that each DC tenant's estimated processing requirements, estimated memory requirements, estimated storage requirements, and estimated network communication requirements are met by allocation of a corresponding integer value of MRSUs; allocate the corresponding integer value of MRSUs to each DC tenant as an MRSU allocation; and transmitting, by a transmitter of the management node, the MRSU allocation to the DC servers for allocation to the DC tenants.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

DCs schedule and allocate a plurality of types of computing resources to each DC tenant to allow the tenant to execute any desired applications. For example, the DC may allocate central processing unit (CPU) cores, processing memory (e.g. Random Access Memory (RAM)), long-term/non-volatile storage, and/or network communication resources to each tenant in a multi-tenant environment. The resources may be allocated upon initiation of a particular process, for example upon creation of a virtual machine (VM), and remain allocated until such resources are released. Such an allocation requires resources be allocated at all times to support a peak resource demand, resulting in idle resources during non-peak times. Alternatively, resources may be allocated as needed by each DC tenant and/or associated application to support full usage of all resources. Each type of resource may be allocated separately, resulting in theoretical optimization gains. However, constant dynamic independent allocation of each type of resource results in immense computational complexity.

Disclosed herein is a MRSU of correlated computing resources, for example processor cores, RAM, memory storage, and/or communication bandwidth. The MRSU may be dynamically determined based on the needs of applications running on a particular DC. For example, the MRSU can be determined as a multidimensional array of resources determined by taking the greatest common divisors of total resources of each type and total estimated application resource requirements of each type. As another example, the MRSU can be determined by setting the MRSU to a minimum estimated resource requirement of any of the applications for each resource type. Once the MRSU is determined, the group of related resources can be allocated as a unit for each time slot, which substantially decreases computational complexity. The MRSU can be re-determined periodically (e.g. each time slot) based on the changing needs of the DC tenants. Allocating an entire group of resources (e.g. an integer number of MRSUs for each tenant) may result in over-allocations. Accordingly, a task based scheduler may be employed to dynamically reallocate over-allocated resources upon request to meet the demands of particular applications when such applications exceed their estimated resource demands.

Figure 1:
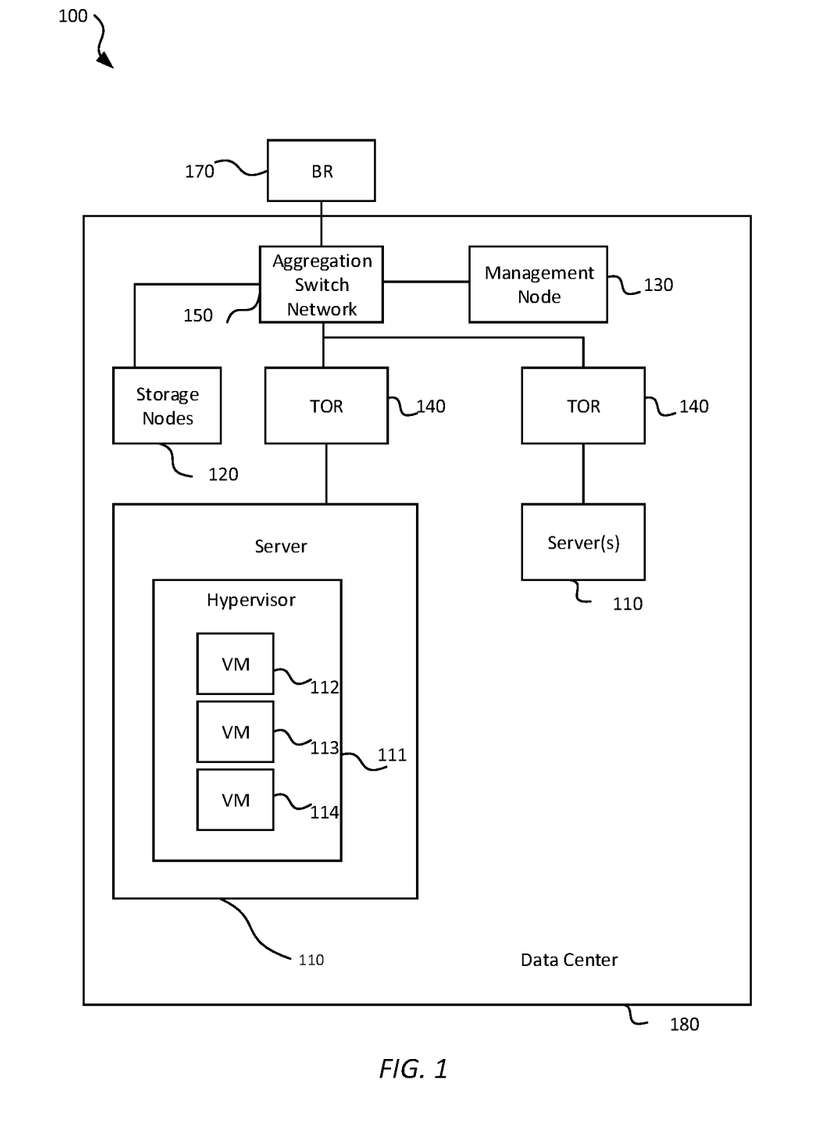
FIG. 1 is a schematic diagram of an embodiment of a DC network.

FIG. 1 is a schematic diagram of an embodiment of a data center network 100 comprising a plurality of resources for dynamic allocation in a cloud computing environment. The data center network 100 may be positioned in a datacenter 180. The network 100 may comprise servers 110, which may operate hypervisors 111. The hypervisors 111 may create and/or operate VMs 112, 113, and 114. VMs 112, 113, and 114 may be operated by different DC tenants in a multi-tenant environment, may not be configured to share common data, and may not be directly aware of each other. The network may also comprise a management node 130, which may be connected to the servers 110. The management node 130 may communicate with the servers 110 and/or the hypervisors 111 to allocate resources for VMs 112, 113, and/or 114. The hypervisors 111 may move all or portions of VMs 112, 113, and 114 to other hypervisors and/or servers dynamically based on allocations from the management node 130. The hypervisors 111 may communicate with management node 130 to facilitate the transmission of VMs 112, 113, and 114 as well as perform associated host routing of active network traffic to VMs 112, 113, and 114.

Datacenter 180 may be a facility used to house computer systems and associated components, such as telecommunications and storage systems. A datacenter 180 may include redundant or backup power supplies, redundant data communications connections, environmental controls (e.g., air conditioning, fire suppression) and security devices. Datacenter 180 may comprise a network 100 to interconnect servers (e.g. servers 110), storage devices (e.g. storage nodes 120), manage communications, and provide remote hosts and/or local hosts access to datacenter 180 resources (e.g. via border routers 170.) A host may be any device configured to request a service (e.g. a process, storage, etc.) from a server (e.g. servers 110.) A host may be a remote host, which may be positioned outside of the datacenter 180 or a local host, which may be positioned inside the datacenter 180. Hosts, servers 110, management node 130, and storage nodes 130 may communicate via an aggregation switch network 150.

A datacenter 180 may house a plurality of servers, such as servers 110. A server 110 may be any device configured to respond to requests, provide services, and/or run applications for hosts. A server 110 may comprise resources such as processor cores/CPUs, processing memory, storage memory, and network communication resources for use in executing DC tenant applications. For example, a server 110 may provide services/execute applications via VMs, such as VMs 112, 113, and/or 114. VMs 112, 113, and/or 114 may be a simulation and/or emulation of a physical machine that may be configured to respond to requests in a predetermined manner (e.g. by operating an application). For example, VMs 112, 113, and/or 114 may run a single program and/or process or act as a system platform such as an operating system (OS) for many applications. VMs 112, 113, and/or 114 may receive requests from hosts, provide data storage and/or retrieval, execute processes, and/or transmit data (e.g. process results) to the hosts. VMs 112, 113, and/or 114 may each be operated by different DC tenants. As a result, VMs 112, 113, and/or 114 may share the same hardware resources, but may be logically separated to maintain security and data integrity for each of the DC tenants and may not interact directly. VMs 112, 113, and/or 114 may be managed by hypervisors 111. A VM may comprise a plurality of virtual interfaces, which may be supported by a hypervisor 111 and may be used to communicate with hosts. Internet Protocol (IP) address(es) and/or media access control (MAC) addresses may be associated with a VM, a VM interface, and/or a plurality of a VM's interfaces. The VMs 112, 113, and/or 114 may share access to server 110 CPU cores, server 110 memory, server 110 network communication resources (e.g. line cards, ports, transmitters, receivers, transceivers, etc.) server 110 storage memory (e.g. hard disks), and/or storage node 120 storage memory based on allocations from the management node 130. While only three VMs are shown, it should be noted that a datacenter 180 may operate any number of VMs. It should also be noted that in some embodiments, the VMs 112, 113, and/or 114 may be implemented by employing alternative virtualization technologies, such as software pods, software containers (e.g. Docker containers), Hadoop schedulable units, resource bundles, resource slots, etc, without departing from the scope of the present disclosure.

A hypervisor 111 may be a hardware, software, and/or firmware VM management entity, which may operate on a server 110, and may act as a virtual operating platform to a VM (e.g. VMs 112, 113, and/or 114.) The hypervisor 111 may create, manage, and transfer VMs to other hypervisor(s). VM mobility may be the transfer of VMs between hypervisors and/or servers. For example, a hypervisor 111 may create and manage VM 112. In the event that server's 110 resources are needed for other processes, a first hypervisor 111 may transmit some or all of VM 112 to a second hypervisor 111 operating on a second server 110, in which case the second hypervisor 111 may employ resources from second server 110 to operate VM 112. Accordingly, hardware resources amongst all servers 110 and storage nodes 120 can be dynamically allocated and/or re-allocated between VMs 112, 113, and/or 114. Accordingly, the management node 130 may consider the data center 180 resources as a whole and globally allocate resources between the VMs as needed to optimize system resource usage.

Servers 110 may be positioned in racks. Each rack may comprise a top-of-rack (ToR) switch 140, which may be a switch used to connect the servers in a datacenter 180 to the datacenter network 100. The ToR switches 140 may be connected to each server 110 in a rack as well as to other ToR switches 140 to allow communication between racks. Racks may be positioned in rows. The ToR switches 140 may be connected to other switches, such as end-of-row (EoR) switches, which may allow communication between rows. EoR switches may be connected as part of an aggregation switch network 150, sometimes referred to as a switch fabric. The aggregation switch network 150 may aggregate communications between the servers for interaction with the datacenter's 180 core network. The aggregation switch network 150 may be connected to routers border routers (BR) 170. Communications may enter and leave the data center 180 via the BR 170. A BR may be the positioned at the border of the network's 100 network domain and may provide connectivity and security between VMs and remote hosts communicating with the VMs (e.g. via the Internet.)

The data center 180 may comprise storage nodes 120. The storage nodes 120 may comprise a plurality of storage devices (e.g. servers with hard disks) configured to store and retrieve data based on commands from the servers 110, VMs 112,113, and/or 114, hypervisors 111, and/or hosts. The storage nodes 120 may be connected to the data center 180 using a high speed connection such as an optical fiber channel.

The data center 180 may also comprise a management node 130. The management node 130 may determine global allocation of all resources (e.g. processor cores, processor memory, storage, and network communication resource) across datacenter 180. The management node 130 may maintain awareness of applications being run by each DC tenant (e.g. VMs 112, 113, and/or 114). The management node 130 may continuously employ application profiles to estimate expected resource requirements for each DC tenant for a specified period of time, referred to herein as a time slot, and may allocate datacenter 180 resources accordingly. Resource allocations for a timeslot may be referred to as a coarse-grain allocation. The management node 130 may also reallocate resources on demand/as needed, for example when a particular application requires resources in excess of the estimated requirements. As a specific example, an application/VM may require an average number of resources during normal periods, increased resources during peak times, and reduced resources during off-peak times. Resource usage may be modeled and estimated according to an application profile that considers usage at various time periods. However, usage spikes may occur randomly, for example during off-peak periods, requiring a short term re-allocation of resources for the duration of the usage spike. A short term on-demand reallocation of resources may be referred to herein as a fine-grain resource allocation.

Global dynamic allocation of all datacenter 180 resources allows for optimal usage of such resources. However, global dynamic allocation may be unrealistically computationally complex and may not be practical in real time. Accordingly, the management node 130 may determine resource allocation my employing MRSUs. An MRSU may be a minimum schedulable unit for a multitenant datacenter comprising a determined number of CPU cores, processing memory (e.g. RAM) measured in Gigabytes (GBs), storage memory measured in GBs, and/or network communication resources measured in bandwidth (e.g. Megabytes (MB) per second (MBps), GB per second (GBps), etc.). The MRSU comprises a plurality of computing resources that can be jointly scheduled to serve a minimum scale application with a specified quality of service. An optimal value for an MRSU may vary between datacenters and even in a single datacenter depending on application needs at a specified instant. As such, an MRSU of correlated resources may be determined for each time slot. An integer number of MRSUs may then be allocated to each DC tenant for operation of associated applications/VMs for the duration of the timeslot. The allocated MRSUs may contain all resources needed to operate the applications, resulting in a single global calculation and a reduction in computational complexity. Allocation of an integer number of MRSUs (e.g. a coarse-grain allocation) may result in over-allocation of some resources. Accordingly, the management node 130 may perform a fine-grain re-allocation of over-allocated resources on demand to support unexpected spikes of resource usage by the DC tenant's applications/VMs.

An MRSU may be formally defined as $\Psi=\{x, y, z, \text{and } w\}$, where $\Psi$ indicates a single MRSU, x indicates an amount of computing resources measured as a number of CPU cores, y indicates an amount of memory resources measured in blocks of RAM in GBs, z indicates an amount of disk storage resources measured in blocks of GBs, and w indicates an amount of networking resources measured in bandwidth (e.g. Mbps). An MRSU can be defined as a set of full tuples (MRSU-FT) where multiples of the MRSU full tuple are allocated to each application. An MRSU may also be defined with independent dimensions (MRSU-ID) where each dimension is independently allocated to each application as a multiple of each MRSU value.

Deriving a single MRSU for global allocation across the multi-tenant data center may require an examination of a joint profile of the set of applications being run by each DC tenant. To create a join profile, the management node 130 combines application profiles taken from across all applications and across all DC tenants so that the joint profile is utilized to derive a DC-wide MRSU. By employing the MRSU computations discussed herein, the MRSU based allocation is adaptive and tunable for each DC based on the workload dynamics of the hosted DC tenants.

Figure 2:
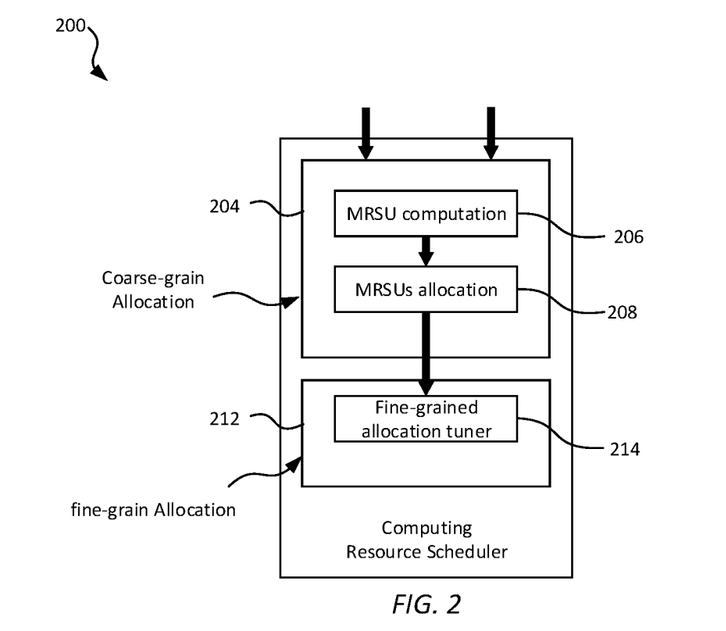
FIG. 2 is a schematic diagram of a computing resource scheduler.

FIG. 2 is a schematic diagram of a computing resource scheduler 200, which may be implemented in a data center, for example, in the management node 130 of the data center 180. The scheduler may manage, schedule, and/or allocate computing resources (e.g. processors, processing memory, storage, and network communication resources) in the data center by employing MRSUs. To schedule use of the computing resources, the scheduler 200 employs a coarse-grained allocation process 204 and a fine-grained allocation process 212. The coarse-grained allocation process 204 allocates the datacenters computing resources for a specified time slot according to estimated or predicted computing resource workloads/requirements of the DC tenants. For example, the coarse-grained allocation process 204 functions as an Application Driven Global Capacity Planner (ADGCP) and coarsely allocates resources throughout the data center according to estimated or predicted workloads based on computing resource location, time, data distribution in the data center at a specified time, available or required quality of service (QoS) levels, and other like characteristics. To allocate the computing resources, the coarse-grained allocation process 204 computes an amount of computing resources to allocate to each application so that the allocation meets or exceeds the expected requirements of the corresponding application. For example, the coarse-grained allocation process 204 employs a MRSU computation process 206 module to determine an MRSU of correlated resources as a multi-dimensional resource vector. The MRSU is determined so that one or more MRSUs, when allocated to a particular DC tenant, can supply sufficient computing resources to meet estimated requirements. The coarse-grained allocation process 204 further employs an MRSU allocation process 208 to allocate an integer value of MRSUs to each DC tenant for the duration of the timeslot. Example MRSU computation and allocation schemes are discussed further herein below.

The coarse-grained allocation process 204 re-calculates the allocations for each time slot, where a time slot is a time interval T over which applications in the datacenter perform processing. The recalculations are performed so that computing resource allocations can be dynamically tailored to the needs of the DC tenants at each specified point in time. The allocation is considered coarse-grained because the dynamic nature of the allocation is limited by the duration of the time slot. For example, applications that request computing resources in the data center may be modeled according to application profiles, which may be calculated by datacenter components (e.g. the management node 130) or received from a host associated with the corresponding DC tenants. Alternatively, the application profiles may be stored in the data center and recalled when an application corresponding to one of the application profiles requests use of computing resources. The coarse-grained allocation process 204 determines the time interval T according to the application profiles such that an allocation of the computing resources by the coarse-grained allocation process 204 can be optimized for the time interval T according to needs of the applications that are requesting computing resources during the time interval T.

The computing resource scheduler 200 also employs a fine-grain resource allocation process 212 that comprises a fine-grain allocation tuner 214 process. The fine-grain allocation tuner 214 is configured to provide dynamic resource allocation changes in a fine-grain manner that is not limited by time slot durations. For example, allocation of MRSUs may result in over-allocation of computing resources to some DC tenants (e.g. one DC tenant may receive excess CPU cores, another DC tenant may receive excess memory, storage, or network communication resources, etc.) The fine-grain allocation tuner 214 may maintain awareness of resource over-allocations. The fine-grain allocation tuner 214 may also receive requests from applications for use of resources in excess of the corresponding allocated resources, for example due to an unexpected spike in resource demands. The fine-grain allocation tuner 214 may reallocate unallocated or over-allocated resources to the applications requesting more resources. Accordingly, each application may receive all resources needed without being limited by time slot. The reallocation by the fine-grain allocation tuner 214 may be considered fine-grain because the allocation is not limited by time slot. The fine-grain allocation tuner 214 may be implemented, for example, by a low-level scheduler such as an AutoScaler, without invoking the ADGCP of the coarse-grained allocation process 204. Accordingly, the fine-grain resource allocation process 212 may require fewer and/or simpler computations that coarse-grained allocation process 204. It should be noted that the coarse-grained allocation process 204 and/or fine-grain resource allocation process 212 may be implemented as software modules, firmware modules, hardware modules, and/or computer program products comprising instructions stored in a non-transitory medium that can be executed by a general purpose processor.

Figure 3:
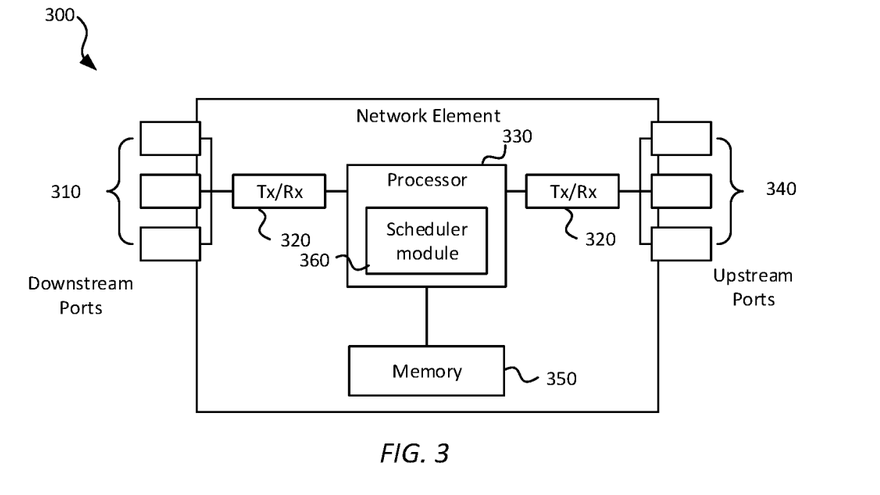
FIG. 3 is a schematic diagram of an embodiment of a network element (NE) for allocating computing resources in a DC.

FIG. 3 is a schematic diagram of an embodiment of a NE 300 for allocating computing resources in a datacenter, such as datacenter 100. The NE 300 may be configured to act as a management node, such as management node 130 and may implement a computing resource scheduler, such as computing resource scheduler 200. NE 300 may also be implemented in a server such as a server 110, a router such as a ToR 140, a storage node, such as storage node 120, or any other component in datacenter 100. NE 300 may also be configured to implement various resource allocation schemes, such as schemes 400, 500, 600, and/or 700. Further, NE 300 may be employed to implement the methods disclosed herein, such as methods 800, 900, and/or 1000 as discussed below. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure are implemented in a network apparatus or component such as an NE 300. For instance, the features/methods in the disclosure may be implemented using hardware, firmware, and/or software installed to run on hardware. The NE 300 is any device that transports frames through a network, e.g., a switch, router, bridge, server, a client, etc. As shown in FIG. 3, the NE 300 may comprise transceivers (Tx/Rx) 320, which are transmitters, receivers, or combinations thereof. A Tx/Rx 320 is coupled to a plurality of downstream ports 310 (e.g. downstream interfaces) for transmitting and/or receiving frames from other nodes and a Tx/Rx 320 coupled to a plurality of upstream ports 340 (e.g. upstream interfaces) for transmitting and/or receiving frames from other nodes, respectively. A processor 330 is coupled to the Tx/Rxs 320 to process the frames and/or determine which nodes to send frames to. The processor 330 may comprise one or more multi-core processors and may be coupled to/comprise memory 350 devices, which function as data stores, buffers, RAM, Read Only Memory (ROM), etc. Processor 330 may be implemented as a general processor or may be part of one or more application specific integrated circuits (ASICs) and/or digital signal processors (DSPs). Processor 330 comprises an allocation module 360, which implements at least some of the schemes/methods discussed herein such as schemes 400-700 and/or methods 800-1000. In an alternative embodiment, the allocation module 360 is implemented as instructions stored in memory 350, which are executed by processor 330, or implemented in part in the processor 330 and in part in the memory 350, for example a computer program product stored in a non-transitory memory that comprises instructions that are executed by the processor 330. In another alternative embodiment, the allocation module 360 is implemented on separate NEs. The downstream ports 310 and/or upstream ports 340 may contain electrical and/or optical transmitting and/or receiving components.

It is understood that by programming and/or loading executable instructions onto the NE 300, at least one of the processor 330, allocation module 360, Tx/Rxs 320, memory 350, downstream ports 310, and/or upstream ports 340 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can also be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
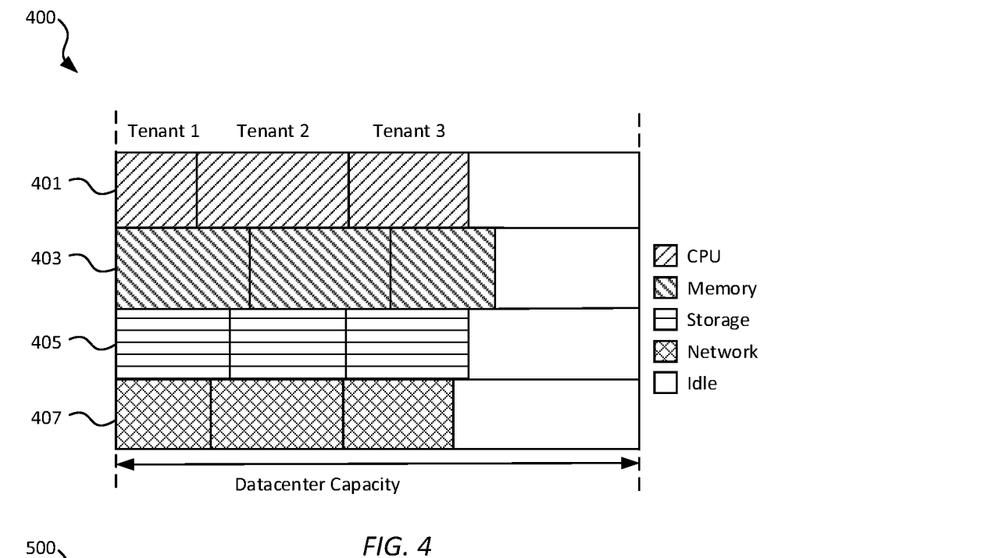
FIG. 4 is a schematic diagram of an embodiment of a resource allocation scheme.

FIG. 4 is a schematic diagram of an embodiment of a resource allocation scheme 400, which may be implemented by a management node, such as management node 130, comprising a resource scheduler, such as computing resource scheduler 200, in a datacenter, such as datacenter 100. Scheme 400 allocates computing resources, such as CPUs 401 as processor resources, memory 403 as processing memory resources, storage 405 as storage resources, and network bandwidth 407 as network communication resources. The computing resources may be allocated from resources available on DC servers, such as servers 110, storage nodes, such as storage nodes 120, and/or switches such as ToR 140 and/or aggregation switch network 150. The processor resources, processing memory resources, storage resources, and network communication resources are allocated to meet estimated processing requirements, memory requirements, storage requirements, and network communication requirements, respectively, of DC tenant 1, DC tenant 2, and DC tenant 3. The scheme 400 may allocate CPUs 401, memory 403, storage 405, and network bandwidth 407 in units of CPU processor cores, GBs of RAM, GBs of memory storage, and/or MBps/GBps of communication bandwidth, respectively. It should be noted that while three DC tenants are shown, any number of DC tenants may have access to the resources of scheme 400. Further, the resources of scheme 400 (CPUs 401, memory 403, storage 405, and network bandwidth 407) may be depicted as an aggregate of each associated resource across the datacenter and may be provided by a plurality of datacenter components, such as servers 110 and/or storage nodes 120.

As shown in FIG. 4, scheme 400 attempts to allocate CPUs 401, memory 403, storage 405, and network bandwidth 407 to each DC tenant based on that tenants estimated requirements in a completely optimal allocation. However, DC tenant requirements change over time, sometimes rapidly. As such, scheme 400 requires constant reallocation. Further, each resource is considered separately requiring a separate computation for each resource type. As such, scheme 400 is immensely computationally complex and requires a significant amount of computational overhead to realize in a dynamic manner.

Figure 5:
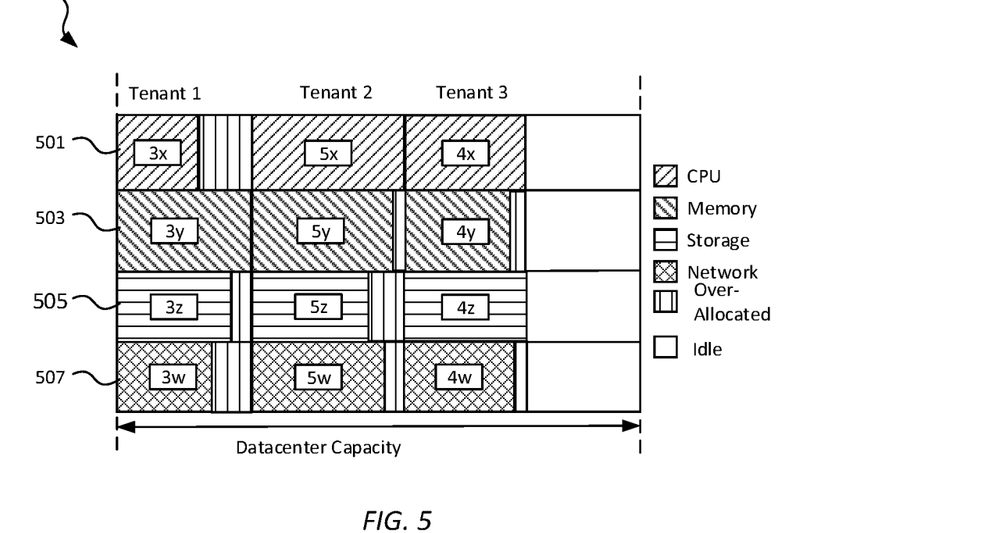
FIG. 5 is a schematic diagram of an embodiment of a resource allocation scheme based on an MRSU determined by a greatest common devisor scheme.

FIG. 5 is a schematic diagram of an embodiment of a resource allocation scheme 500 based on an MRSU determined by a greatest common divisor scheme. Scheme 500 may be implemented by a management node, such as management node 130, comprising a resource scheduler, such as computing resource scheduler 200, in a datacenter, such as datacenter 100 on computing resources in a manner substantially similar to scheme 400. Scheme 500 depicts a MRSU-FT implementation, where the tuples comprise CPUs 501 as processor resources (x), memory 503 as processing memory resources (y), storage memory 505 as storage resources (z), and network bandwidth 507 as network communication resources(w). The management node may determine the values of x, y, z, and w by determining the greatest common divisor of all DC tenant estimated processing requirements as x, the greatest common divisor of all DC tenant estimated processing memory requirements as y, the greatest common divisor of all DC tenant estimated storage memory requirements as z, and the greatest common divisor of all DC tenant estimated network communication requirements as w. The tuple x, y, z, and w may define the MRSU values of $\Psi$ for the next time slot. Upon determining the MRSU tuples, the CPUs 501, memory 503, storage 505, and network bandwidth 507 may be allocated as multiple of the full tuple x, y, z, and w on a tenant by tenant basis to meet each DC tenants estimated requirements. For example, tenant 1 may require 2x, 3y, 2.7z, and 2.2 w. As 3 tuples are needed to meet tenant 1's greatest requirement (e.g. processing memory requirement of 3y), all other values are set to 3 as well so that only full tuples are assigned. The allocation of 3 MRSUs to tenant 1 results in over-allocation of 1x, 0.3z, and 0.8w, which can be dynamically reallocated by the fine-grain scheduler upon demand. Likewise, tenant 2 may require 5x, 4.8y, 4z, and 4.7w, resulting in an allocation of 5 MRSUs (because 5 MRSUs must be employed to satisfy 5x) or 5x, 5y, 5z, and 5w and an over-allocation of 0.2y, 1z, and 0.3w. Further, tenant 3 may require 4x, 3.7y, 4z, and 3.8w, resulting in an allocation of 4 MRSUs or 4x, 4y, 4z, and 4w and an over-allocation of 0.3y, and 0.2w. Unallocated resources may remain idle until needed by a fine-grain allocation. By employing the MRSU-FT implementation of scheme 500, allocations can be simultaneously made across a multi-dimensional array of correlated resources resulting in decreased processing overhead per time slot.

Figure 6:
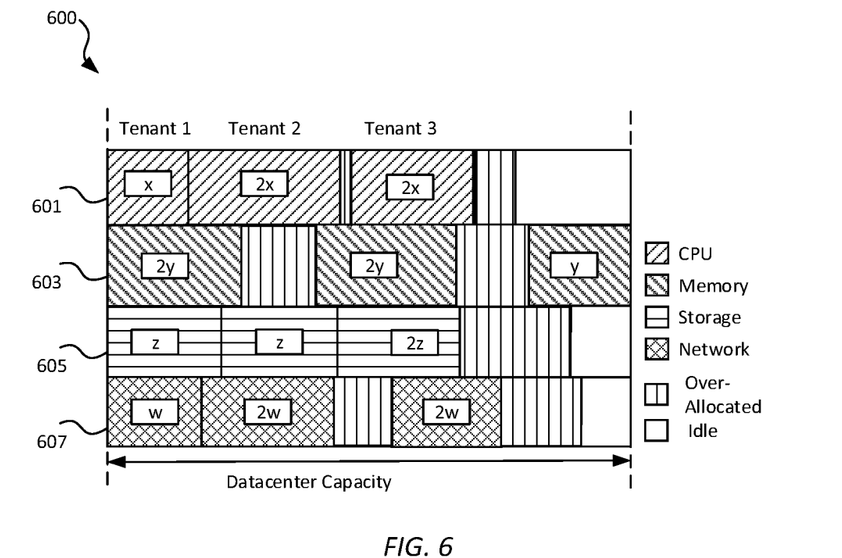
FIG. 6 is a schematic diagram of an embodiment of a resource allocation scheme based on an MRSU determined by a minimum requirement scheme.

FIG. 6 is a schematic diagram of an embodiment of a resource allocation scheme 600 based on an MRSU determined by a minimum requirement scheme. Scheme 600 may be implemented by a management node, such as management node 130, comprising a resource scheduler, such as computing resource scheduler 200, in a datacenter, such as datacenter 100 on computing resources in a manner substantially similar to schemes 400-500. Scheme 600 depicts a MRSU-ID implementation, where the dimensions comprise CPUs 601 as processor resources (x), memory 603 as processing memory resources (y), storage 605 as storage resources (z), and network bandwidth 607 as network communication resources (w). The management node may determine the value x by estimating processing requirements for each DC tenant and selecting x as processor resources sufficient to meet the estimated processing requirements of the DC tenant with the minimum estimated processing requirement. Likewise, y may be determined by selecting processing memory resources as y where y memory resources are sufficient to meet a minimum estimated memory requirement of all of the DC tenants' estimated memory requirements. Further, z may be determined by selecting storage resources as z where z storage resources are sufficient to meet a minimum estimated storage requirement of all of the DC tenants' estimated storage requirements. Also, w may be determined by selecting network communication resources as w where w network communications resources are sufficient to meet a minimum estimated network communication requirement of all of the DC tenants' estimated network communication requirements. The determined values of x, y, z, and w may then define the value ($\Psi$) of an MRSU for the next time slot, where $\Psi$ is a multi-dimensional array of independently allocated dimensions of resource values. Upon determining the MRSU definition, the CPUs 601, memory 603, storage 605, and network bandwidth 607 may each be allocated independently in terms of MRSUs. For example, tenant 1 may require the fewest estimated processing resources, so a value of processing resources sufficient to meet tenant 1's estimated processing requirements is set as x. Tenant 3 may require the fewest estimated memory resources, so a value of memory sufficient to meet tenant 3's processing memory resource requirements is set to y. Tenants 1 and 2 may tie for the fewest estimated storage resource requirements, so a value of storage memory sufficient to meet both tenant 1's and tenant 2's storage requirements are set to z. Tenant 1 may require the fewest estimated network communications requirements, so a value of network communications resources sufficient to meet tenant 1's estimated network communications requirements is set to w. Once the values of the MRSU are determined, each tenant can be allocated resources as a multiple of the corresponding value of the MRSU. For example, tenant 1 may require x, tenant 2 may require 1.9x, and tenant 3 may require 1.7x, resulting in an allocation of x, 2x, and 2x, respectively, to meet or exceed each tenants processing resources requirements in integer multiples of the corresponding MRSU value. Further, tenant 1 may require 1.1 y, tenant 2 may require 1.2y, and tenant 3 may require y, resulting in an allocation of 2y, 2y, and y, respectively. Tenants 1 and 2 may require z and tenant 3 may require 1.3z, resulting in an allocation of z, z, and 2z, respectively. Finally, tenant 1 may require w, tenant 2 may require 1.7w, and tenant 3 may require 1.2w, resulting in an allocation of w, 2w, and 2w, respectively. As with scheme 500, the MRSU implementation of scheme 600 results in over-allocation which can be employed by the fine-grain scheduler along with the idle resources to meet changing requirements on demand. By employing MRSU-ID implementation of scheme 600, allocations can be made across a multi-dimensional array of correlated resources resulting in decreased processing overhead per time slot.

Figure 7:
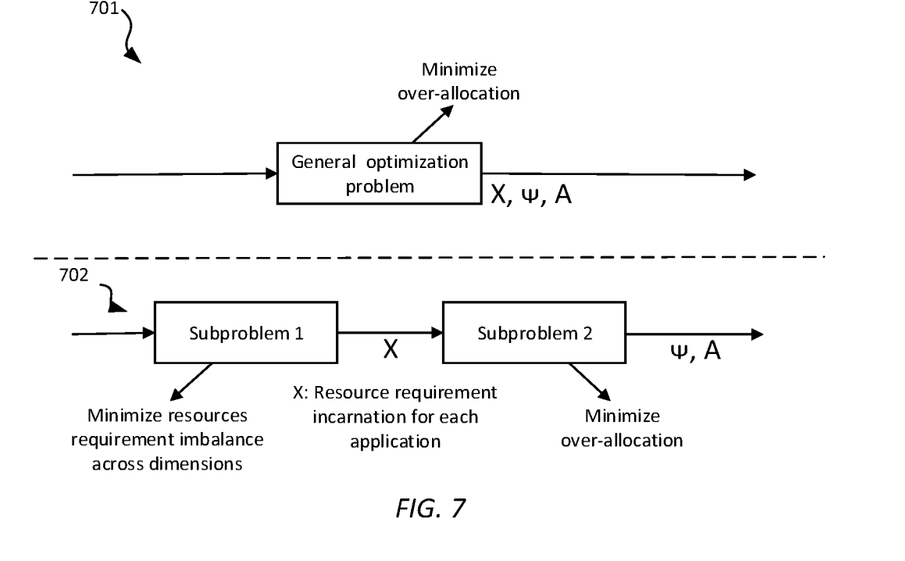
FIG. 7 illustrates schematic diagrams comparing embodiments of resource allocation problem formulation schemes.

FIG. 7 illustrates schematic diagrams comparing embodiments of resource allocation problem formulation schemes 701 and 702. Schemes 701-702 may be implemented by a management node, such as management node 130, comprising a resource scheduler, such as computing resource scheduler 200, in a datacenter, such as datacenter 100 on computing resources in a manner substantially similar to schemes 400-600. Problem formulation scheme 701 determines incarnations of actual resources selected for each application (X), MRSU values ($\Psi$), and resource allocation (A) by solving a single general optimization problem for minimizing resource over-allocation. By treating X, $\Psi$, A as part of single problem formulation, X, $\Psi$, A each become interrelated which increases the complexity of the overall problem. Problem formulation scheme 702 simplifies 701 treating the optimization problem as multiple separate problems. Scheme 702 first determines X by determining resource requirements for each DC tenant while attempting to incarnation imbalances across dimensions. For example, an estimate of memory resources may be increase to match an elevated estimation of required processor resources. Once a balanced incarnation (e.g. set) of resources is determined, selection of $\Psi$ and A become simplified. A can then be calculated with the goal of minimizing over-allocation to meet the balanced resource requirement incarnations. As a result, scheme 701 may result in more optimal coarse-grain allocations at the cost of greater processor overhead. However, the potential inaccuracies introduced by scheme 702 may be overcome by fine-grain optimization on demand by a fine-grain allocation tuner, such as fine-grain allocation tuner 214.

Regardless of the scheme employed, the optimization problem should minimize over-allocation of resources over each time interval T, while still guaranteeing that capacity, fairness, prioritization, and resource requirement constraints are met for each DC tenant. Further, solutions to the problems discussed herein account for resource malleability. Resource malleability occurs when several resource combinations (e.g. incarnations) can be determined to meet an applications demands. Employing the concept of resource malleability allows the scheduler to select the resource combinations for each application that are most beneficial for the overall datacenter (e.g. minimize over-allocation) without compromising requirement satisfaction.

An optimal allocation can be determined by applying an objective function that is subject to constraints. The objective function is tailored to determine MRSU values, the number of MRSUs allocated to each application, and the incarnation of resources (e.g. the particular resources corresponding to each MRSU) to be allocated to each application. The objective function should minimize over-allocation and guarantee minimax fairness, where minimax fairness fairly allocates resources to each application while minimizing the possible worst case under-allocation on a per application basis. The objective function may be mathematically stated according to equation 1.

Equation 1

$$\min_{A,\bar{\psi}^T,X} \max \sum_{n=1}^{N} \sum_{d=1}^{D} \left| \frac{\psi_d^T}{T} \sum_{t=1}^{T} a_n^t - \sum_{i=1}^{I} r_{n,d}^i x_n^i \right|$$

where A is a time allocation matrix indicating the number of MRSUs allocated to each application (a) at each time instant (t), T is an interval for which the MRSU definition is valid (e.g. a time slot), $\Psi^T$ is an MRSU for a timeslot, X is an incarnation selection matrix indicating a particular resource combination selected for each application, N is a number of applications in the datacenter, D is a number of resource dimensions (e.g. a number of resource types to be allocated), and $r_{ndi}$ indicates peak resource requirements for application n in dimension d with incarnation i. The objective function is a modification of a multiple-choice knapsack problem, where groups of items are considered (e.g. resources to be selected) and a management node must select one item from each group to maximize profit (e.g. fair allocation). An item is an amount of a resource, while each group of items is represented by the different incarnations for that specific resource.

The objective function may be constrained by a plurality of constraints. For example, constraints may include a first constraint (C1) requiring that a resource allocation for all applications in each time slot cannot exceed an associated resource capacity in any dimension; a second constraint (C2) comprising a priority-based peak resource constraint requiring that applications with higher priorities receive average resources over T closer to their peak requirements than lower-priority applications; a third constraint (C3) requiring that each application be allocated a discrete number of MRSUs; a fourth constraint (C4) requiring that the MRSU be a multi-dimensional array of resources such that each dimension contains a value greater than zero; and a fifth constraint (C5) and sixth constraint (C6) requiring that only one incarnation (e.g. specific combination of computing, memory, storage, and networking resources) may be selected for each application. Constraints C1-C6 are mathematically described as shown in equations 2-7:

Equation 2

$$\psi_d^T \sum_{n=1}^{N} a_n^t \leq C_d \qquad \text{C1}$$

$$\forall d = 1, \ldots, D; \forall t = 1, \ldots, T$$

Equation 3

$$\frac{\psi_d^T}{T} \sum_{t=1}^{T} a_n^t \geq \omega_n \sum_{i=1}^{I} r_{n,d}^i x_n^i \qquad \text{C2}$$

$$\forall n = 1, \ldots, N; \forall d = 1, \ldots, D$$

Equation 4

$$A = \{a_n^t\}_{n=1,\ldots,N}^{t=1,\ldots,T}, a_n^t \in \mathbb{N} \qquad \text{C3}$$

$$\forall n = 1, \ldots, N; \forall t = 1, \ldots, T$$

Equation 5

$$\bar{\psi}^T \in (\mathbb{R}^+)^D \qquad \text{C4}$$

Equation 6

$$X = \{x_n^j\}_{n=1,\ldots,N}^{j=1,\ldots,I}, x_n^j \in \{0, 1\} \qquad \text{C5}$$

$$\forall n = 1, \ldots, N; \forall t = 1, \ldots, T$$

Equation 7

$$\sum_{i=1}^{I} x_n^j = 1 \qquad \text{C6}$$

$$\forall n = 1, \ldots, N$$

where A is a time allocation matrix indicating the number of MRSUs allocated to each application at each time instant, $\forall$ is a mathematical operator indicating an operation should be performed for all of an associated set, $\mathbb{R}$ stands for all real numbers, $\mathbb{N}$ stands for all natural numbers, T an interval for which the MRSU definition is valid (e.g. a time slot), $\Psi^T$ is an MRSU for a timeslot, X is an incarnation selection matrix indicating a particular resource combination selected for each application, N is a number of applications in the datacenter, D is a number of resource dimensions (e.g. a number of resource types to be allocated), $r_{ndi}$ indicates peak resource requirements for application n in dimension d with incarnation I, $C_d$ is a datacenter capacity in dimension d, and $\omega_n$ is a priority of application n where $\omega_n$ is greater than zero and less than or equal to one.

The objective function and constraints may be solved by the two sub-problem approach of scheme 702 by employing the first sub-problem to select an incarnation of each application, for example by minimizing resource imbalances across dimensions. Constraint C4 should be met to ensure feasibility of the allocation in the second sub-problem and constraints C5-C6 should be met to simplify the second sub-problem. The second sub-problem may then determine the MRSU definition for the timeslot and allocate an integer number of MRSUs to each application given a single set of requirements per application. The optimization problem is simplified for the second sub-problem since X is determined in the first sub-problem allowing constraints C5-C6 to be ignored in the second sub-problem.

Figure 8:
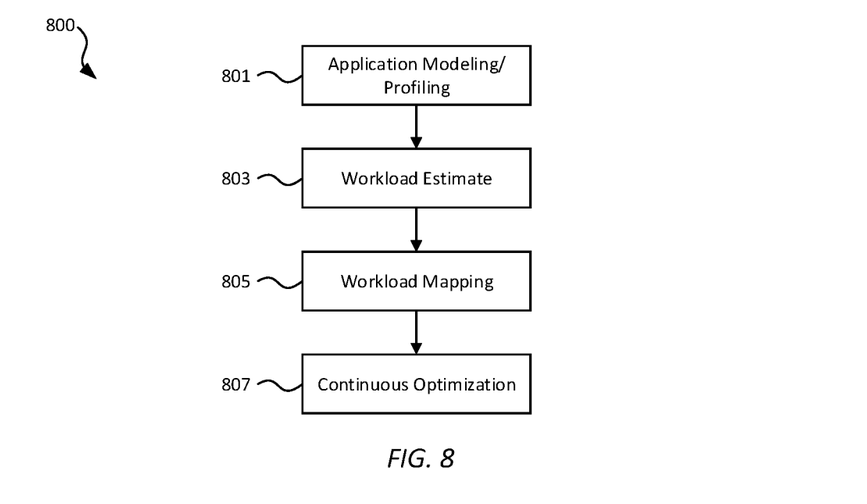
FIG. 8 is a flowchart of an embodiment of a method of DC resource management.

FIG. 8 is a flowchart of an embodiment of a method 800 of DC resource management, which may be implemented by a management node, such as management node 130, comprising a resource scheduler, such as computing resource scheduler 200, in a datacenter, such as datacenter 100 on computing resources contained in the data center (e.g. on servers 110, storage nodes 120, ToRs 140, and/or aggregation switch network 150). At step 801, the management node performs application modeling/profiling. The modeling/profiling of step 801 allows the management node to determine the frequency and extent of resource usage of each application operating on the datacenter, for example during peak times, off-peak times, etc. The modeling/profiling of step 801 may further comprise the creation of a joint application profile for the entire datacenter by aggregating the profiles of all application operating in the datacenter. At step 803, the management node may perform a workload estimate for a particular timeslot, for example based on the characteristics of the joint profile over a time period corresponding to the particular time slot. At step 805, the management node performs a workload mapping by determining an MRSU for the timeslot, allocating an integer number of MRSUs to each application, and allocating assigning computing resources corresponding to the MRSUs to each application on a tenant by tenant basis. At step 807, the management node performs continuous optimization by employing fine-grain allocation tuner, such as fine-grain allocation tuner 214 to re-allocated over-allocated or idle resource upon demand. Further, method 800 may return to steps 801, 803, and/or 805 for continuous recalculation of MRSU and re-allocation of resources in successive timeslots as application profile and/or corresponding requirements change.

Figure 9:
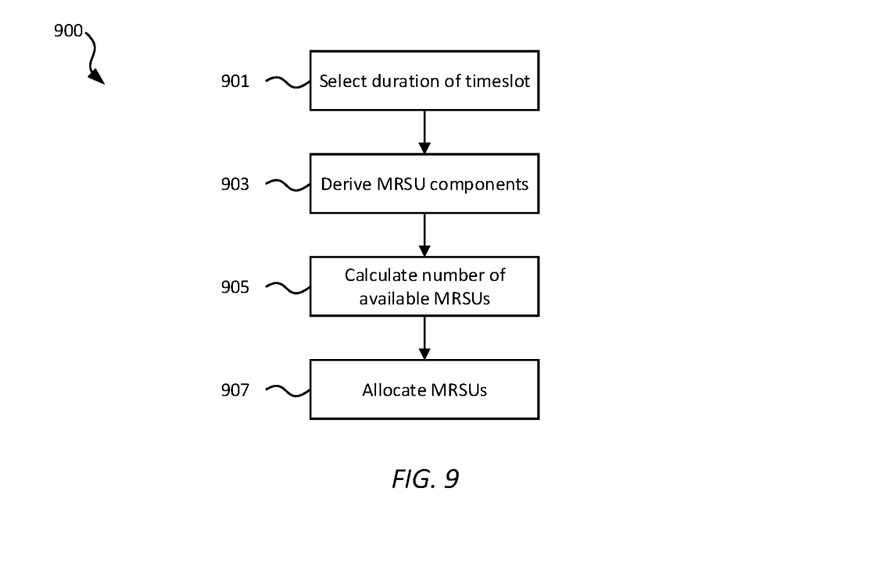
FIG. 9 is a flowchart of an embodiment of a method of MRSU based resource allocation.

FIG. 9 is a flowchart of an embodiment of a method 900 of MRSU based resource allocation, which may be implemented by a management node, such as management node 130, comprising a resource scheduler, such as computing resource scheduler 200, in a datacenter, such as datacenter 100 on computing resources contained in the data center (e.g. on servers 110, storage nodes 120, ToRs 140, and/or aggregation switch network 150). At step 901, the management node selects a duration of the timeslot for a corresponding MRSU. A timeslot duration may be selected based on the profile information. For example, a profile indicating rapid drastic changes in application requirements over a particular period may require a shorter timeslot, while a long duration of steady state demand may allow for a longer timeslot. At step 903, the MRSU may be determined by deriving the relevant MRSU components, for example by calculating an MRSU-FT by employing schemes 500 or an MRSU-ID by employing scheme 600. At step 905, the management node may calculate the number of MRSUs available for allocation based on the total capacity of the datacenter. At step 907, the MRSUs are allocated to the applications on an application by application basis and/or an a DC tenant by DC tenant basis.

Figure 10:
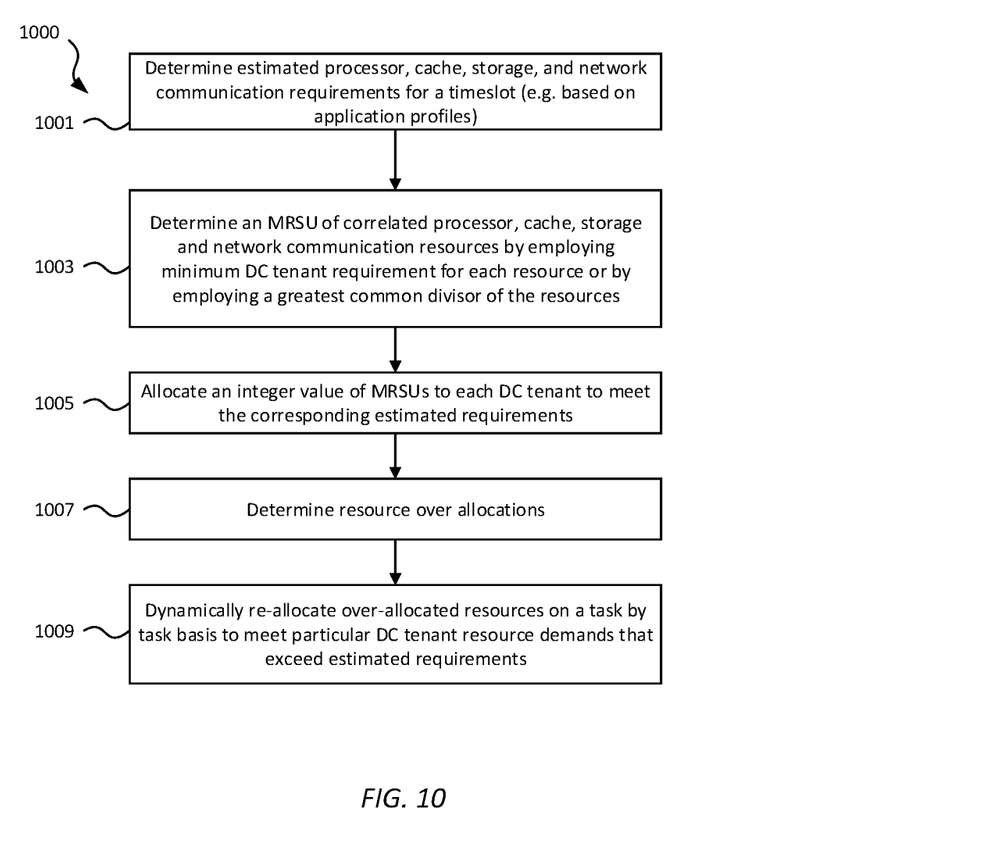
FIG. 10 is a flowchart of an embodiment of a method of MRSU based resource allocation with dynamic re-allocation.

FIG. 10 is a flowchart of an embodiment of a method 1000 of MRSU based resource allocation with dynamic re-allocation, which may be implemented by a management node, such as management node 130, comprising a resource scheduler, such as computing resource scheduler 200, in a datacenter, such as datacenter 100 on computing resources contained in the data center (e.g. on servers 110, storage nodes 120, ToRs 140, and/or aggregation switch network 150). At step 1001, the management node determines estimated processor, memory, storage, and network communication requirements for a timeslot, for example based on application profiles and/or datacenter wide joint profiles. Step 1001 may be completed by determining X according to scheme 701 or sub-problem 1 of scheme 702. At step 1003, the management node determines an MRSU of correlated processor, memory, storage and network communication resources for the timeslot by employing minimum DC tenant requirement for each resource according to scheme 600 or by employing a greatest common divisor of the resources according to scheme 500. Step 1003 may be completed by determining $\Psi$ according to scheme 701 or sub-problem 2 of scheme 702. At step 1005, the management node allocates an integer value of MRSUs to each DC tenant for the timeslot to meet the corresponding estimated requirements of applications operating for the corresponding DC tenant, for example by allocating according to schemes 500 and/or 600. Step 1003 may be completed by determining A according to scheme 701 or sub-problem 2 of scheme 702. Steps 1001, 1003, and 1005 may be completed by a coarse-grained allocation process, such as coarse-grained allocation process 204. At step 1007, the management node employs a fine-grained allocation process, such as fine-grained allocation process 212 to determine resource over allocations for the timeslot. At step 1009, the management node employ the fine-grained allocation process to dynamically re-allocate over-allocated resources and/or idle resources on a task by task basis to meet particular DC tenant resource demands that exceed estimated requirements, for example to meet unexpected spikes in demand.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a processor configured to:
  obtain estimated processing requirements for a plurality of data center (DC) tenants;
  obtain estimated memory requirements for the DC tenants;
  obtain estimated storage requirements for the DC tenants; and
  obtain estimated network communication requirements for the DC tenants;
  determine a Minimum Resource Schedulable Unit (MRSU) for the tenants, the determined MRSU comprising a dynamically allocatable group of correlated processor resources, processing memory resources, storage resources, and network resources, wherein the correlated processor resources, processing memory resources, storage resources, and network resources are comprised in at least one of a plurality of DC servers, and wherein the MRSU is determined such that each DC tenant's estimated processing requirements, estimated memory requirements, estimated storage requirements, and estimated network communication requirements are met by allocation of a corresponding integer value of MRSUs; and
  allocate the corresponding integer value of MRSUs to each DC tenant as an MRSU allocation; and
a transmitter coupled to the processor and configured to transmit the MRSU allocation to the DC servers to instruct the DC servers to implement the MRSU allocation for the DC tenants.

2. The apparatus of claim 1, wherein the MRSU is expressed as a multi-dimensional array of resources, and wherein each dimension of the MRSU contains a value greater than zero.

3. The apparatus of claim 1, wherein determining the MRSU comprises:
   determining a greatest common divisor of the estimated processing requirements for each DC tenant as a value of MRSU processor resources;
   determining a greatest common divisor of the estimated memory requirements for each DC tenant as a value of MRSU processing memory resources;
   determining a greatest common divisor of the estimated storage requirements for each DC tenant as a value of MRSU storage resources; and
   determining a greatest common divisor of the estimated network communication requirements for each DC tenant as a value of MRSU network resources.

4. The apparatus of claim 1, wherein determining the MRSU comprises:
   selecting a minimum processing requirement of the DC tenants' estimated processing requirements as the MRSU processor resources;
   selecting a minimum memory requirement of the DC tenants' estimated memory requirements as the MRSU processing memory resources;
   selecting a minimum storage requirement of the DC tenants' estimated storage requirements as the MRSU storage resources; and
   selecting a minimum network communication requirement of the DC tenants' estimated network communication requirements as the MRSU network resources.

5. The apparatus of claim 1, wherein the processor is further configured to:
   implement a global scheduler configured to allocate the integer values of MRSUs to each DC tenant as the MRSU allocation; and
   implement a task-based scheduler configured to update the MRSU allocation by:
      determining a resource over-allocation resulting from allocating the integer values of MRSUs; and
      dynamically reallocating the resource over-allocation to one or more of the DC tenants when the one or more DC tenants request to employ resources in excess of estimated requirements.

6. The apparatus of claim 1, wherein the MRSU is re-determined for each of a plurality of time slots.

7. The apparatus of claim 6, wherein the MRSU allocation is re-allocated each time the MRSU is re-determined.

8. The apparatus of claim 1, wherein the estimated processing requirements, estimated memory requirements, estimated storage requirements, and estimated network communication requirements are determined based on DC tenant quality of service (QoS) requirements and DC tenant data location.

9. The apparatus of claim 1, wherein the estimated processing requirements, estimated memory requirements, estimated storage requirements, and estimated network communication requirements are obtained based on application profiles associated with the DC tenants.

10. The apparatus of claim 1, wherein the MRSU is determined by applying an objective function selected to minimize resource over-allocation and maximize resource allocation fairness.

11. A method implemented in a management node, the method comprising:
   determining, by a processor of the management node, estimated application resource requirements for a plurality of tenants in a Data Center (DC), wherein the estimated application resource requirements comprise estimated processing requirements, estimated memory requirements, and estimated storage requirements;
   determining, by the processor, a Minimum Resource Schedulable Unit (MRSU) for the tenants, the determined MRSU comprising a dynamically allocatable group of correlated processor resources, processing memory resources, and storage resources, wherein the correlated processor resources, processing memory resources, and storage resources are comprised in at least one of a plurality of DC servers, and wherein the MRSU is determined such that each DC tenant's estimated processing requirements, estimated memory requirements, and estimated storage requirements are met by allocation of a corresponding integer value of MRSUs;
   allocating, by the processor, the corresponding integer value of MRSUs to each DC tenant as an MRSU allocation; and
   transmitting, by a transmitter of the management node, the MRSU allocation to the DC servers to instruct the DC servers to implement the MRSU allocation for the DC tenants.

12. The method of claim 11, wherein determining the MRSU comprises:
   determining a greatest common divisor of the estimated processing requirements for each DC tenant as a value of MRSU processor resources;
   determining a greatest common divisor of the estimated memory requirements for each DC tenant as a value of MRSU processing memory resources; and
   determining a greatest common divisor of the estimated storage requirements for each DC tenant as a value of MRSU storage resources.

13. The method of claim 11, wherein determining the MRSU comprises:
   selecting a minimum processing requirement of the DC tenants' estimated processing requirements as the MRSU processor resources;
   selecting a minimum memory requirement of the DC tenants' estimated memory requirements as the MRSU processing memory resources; and
   selecting a minimum storage requirement of the DC tenants' estimated storage requirements as the MRSU storage resources.

14. The method of claim 11, wherein the MRSU is expressed as a multi-dimensional array of resources, and wherein each dimension of the MRSU contains a value greater than zero.

15. The method of claim 11, further comprising:
   determining a resource over-allocation resulting from allocating the integer values of MRSUs; and
   dynamically reallocating the resource over-allocation to one or more of the DC tenants when the one or more DC tenants request to employ DC resources in excess of estimated application resource requirements.

16. The method of claim 11, wherein the MRSU is re-determined for each of a plurality of time slots, and wherein the MRSU allocation is re-allocated each time the MRSU is re-determined.

17. A non-transitory computer readable medium comprising a computer program product of executable instructions stored on the non-transitory computer readable medium such that when executed by a processor cause a management node in a Data Center (DC) to:
- determine estimated application resource requirements for a plurality of tenants in the DC, wherein the estimated application resource requirements comprise estimated processing requirements, estimated memory requirements, estimated storage requirements, and estimated network communication requirements for each DC tenant;
- determine a Minimum Resource Schedulable Unit (MRSU) for the tenants, the determined MRSU comprising a dynamically allocatable group of correlated processor resources, processing memory resources, storage resources, and network resources, wherein the correlated processor resources, processing memory resources, storage resources, and network resources are comprised in at least one of a plurality of DC servers, and wherein the MRSU is determined such that each DC tenant's estimated processing requirements, estimated memory requirements, estimated storage requirements, and estimated network communication requirements are met by allocation of a corresponding integer value of MRSUs;
- allocate the corresponding integer value of MRSUs to each DC tenant as an MRSU allocation; and
- transmitting, by a transmitter of the management node, the MRSU allocation to the DC servers to instruct the DC servers to implement the MRSU allocation for the DC tenants.

18. The non-transitory computer readable medium of claim 17, wherein determining the MRSU comprises:
- determining a greatest common divisor of the estimated processing requirements for each DC tenant as a value of the MRSU processor resources;
- determining a greatest common divisor of the estimated memory requirements for each DC tenant as a value of the MRSU processing memory resources;
- determining a greatest common divisor of the estimated storage requirements for each DC tenant as a value of the MRSU storage resources; and
- determining a greatest common divisor of the estimated network communication requirements for each DC tenant as a value of the MRSU network resources.

19. The non-transitory computer readable medium of claim 17, wherein determining the MRSU comprises:
- selecting a minimum processing requirement of the DC tenants' estimated processing requirements as the MRSU processor resources;
- selecting a minimum memory requirement of the DC tenants' estimated memory requirements as the MRSU processing memory resources;
- selecting a minimum storage requirement of the DC tenants' estimated storage requirements as the MRSU storage resources; and
- selecting a minimum network communication requirement of the DC tenants' estimated network communication requirements as the MRSU network resources.

20. The non-transitory computer readable medium of claim 17, wherein the MRSU is expressed as a multi-dimensional array of resources, and wherein each dimension of the MRSU contains a value greater than zero.

* * * * *

UNITED STATES PATENT AND TRADEMARK OFFICE
CERTIFICATE OF CORRECTION

PATENT NO. : 10,129,101 B2
APPLICATION NO. : 15/132443
DATED : November 13, 2018
INVENTOR(S) : Min Luo et al.

Page 1 of 1

It is certified that error appears in the above-identified patent and that said Letters Patent is hereby corrected as shown below:

On the Title Page

(72) Inventors should read:
Min Luo, San Jose, CA (US); David Gutierrez Estevez, San Francisco, CA (US); Jiafeng Zhu, San Ramon, CA (US)

Signed and Sealed this
Eighth Day of January, 2019

Andrei Iancu
*Director of the United States Patent and Trademark Office*